(12) United States Patent
Kimbrough

(10) Patent No.: US 6,781,981 B1
(45) Date of Patent: Aug. 24, 2004

(54) ADDING DSL SERVICES TO A DIGITAL LOOP CARRIER SYSTEM

(75) Inventor: Mahlon Danny Kimbrough, Bedford, TX (US)

(73) Assignee: Advanced Fibre Access Corporation, Petaluma, CA (US)

( * ) Notice: Subject to any disclaimer, the term of this patent is extended or adjusted under 35 U.S.C. 154(b) by 0 days.

(21) Appl. No.: 09/150,817

(22) Filed: Sep. 11, 1998

(51) Int. Cl.[7] .............................................. H04L 12/66
(52) U.S. Cl. .................. 370/352; 370/356; 370/395.53
(58) Field of Search ................................ 370/352–356, 370/237–238, 419, 524, 536, 493–496, 522, 535, 420, 463, 485–487

(56) References Cited

U.S. PATENT DOCUMENTS

| | | | |
|---|---|---|---|
| 4,881,225 A | 11/1989 | Dyke et al. .................. 370/458 |
| 4,888,765 A | 12/1989 | Dyke .......................... 370/468 |
| 4,903,292 A | 2/1990 | Dillon ........................ 370/496 |
| 4,967,193 A | 10/1990 | Dyke et al. .............. 340/825.5 |
| 5,046,067 A | 9/1991 | Kimbrough ................. 370/377 |
| 5,263,081 A | 11/1993 | Nightingale et al. ........ 379/236 |
| 5,267,122 A | 11/1993 | Glover et al. ............... 361/704 |
| 5,287,344 A | 2/1994 | Bye et al. .................... 370/360 |
| 5,303,229 A | 4/1994 | Withers et al. ............. 370/490 |
| 5,325,223 A | 6/1994 | Bears .......................... 359/137 |
| 5,349,457 A | 9/1994 | Bears .......................... 359/118 |
| 5,355,362 A | 10/1994 | Gorshe et al. ............... 370/384 |
| 5,383,180 A | 1/1995 | Kartalopoulos ............. 370/389 |
| 5,469,282 A | 11/1995 | Ishioka ....................... 359/110 |
| 5,500,753 A | 3/1996 | Sutherland .................. 359/125 |
| 5,504,606 A | 4/1996 | Frigo .......................... 359/118 |
| 5,566,239 A | 10/1996 | Garcia et al. .......... 379/399.01 |
| 5,572,347 A | 11/1996 | Burton et al. ............... 359/124 |
| 5,600,469 A | 2/1997 | Yamazaki ................... 359/135 |
| 5,608,565 A | 3/1997 | Suzuki et al. ............... 359/237 |
| 5,640,387 A | 6/1997 | Takahashi et al. .......... 370/359 |
| 5,729,370 A | 3/1998 | Bernstein et al. ........... 359/118 |
| 5,757,803 A | 5/1998 | Russell et al. .............. 370/494 |
| 5,784,377 A | 7/1998 | Baydar et al. .............. 370/463 |
| 5,910,970 A | * | 6/1999 | Lu .............................. 375/377 |
| 6,075,784 A | * | 6/2000 | Frankel et al. .............. 370/356 |
| 6,118,780 A | * | 9/2000 | Dunn et al. ................. 370/493 |
| 6,188,912 B1 | * | 2/2001 | Struhsaker et al. ......... 455/561 |
| 6,314,102 B1 | * | 11/2001 | Czerwiec et al. ........... 370/485 |
| 6,320,856 B1 | * | 11/2001 | Deschaine et al. .......... 370/337 |
| 6,349,096 B1 | * | 2/2002 | Liu et al. ..................... 370/352 |
| 6,421,356 B2 | * | 7/2002 | Carter et al. ................ 370/485 |

FOREIGN PATENT DOCUMENTS

| | | |
|---|---|---|
| EP | 891067 | 1/1999 |
| WO | 9312624 | 6/1993 |
| WO | 9825382 | 6/1998 |

* cited by examiner

*Primary Examiner*—Frank Duong
*Assistant Examiner*—Melanie Jagannathan
(74) *Attorney, Agent, or Firm*—Jones Day

(57) ABSTRACT

An improved digital loop carrier system for transporting voice and DSL data signals in the local loop. The digital loop carrier system includes a remote digital terminal having an interface terminal, a common equipment shelf for interfacing digital voice signals to the central office switch, and a plurality of copper shelves coupled to the common shelf for holding voice line-cards that convert digital voice signals into analog voice signals (and vice versa) for transport to customer premises. At least one copper shelf is configured to include an auxiliary packet data bus for connecting combination voice/DSL line-cards and at least one data uplink card. The data uplink card is coupled to the interface terminal to enable DSL data transport without impacting digital voice capabilities through the common equipment. Also disclosed is an optional Ethernet switch in the remote digital terminal for concentrating multiple DSL signals prior to transport back to the central office.

19 Claims, 7 Drawing Sheets

ADDING DSL SERVICES TO A DIGITAL LOOP CARRIER SYSTEM

BACKGROUND OF THE INVENTION

The present invention is related to the field of data communications in the local access loop of the telephone network. In particular, a system and method are disclosed for providing high-speed data and voice services over standard twisted-pair voice-lines in a digital loop carrier ("DLC") system.

In a typical DLC system, the digital transport capabilities of the phone network are extended from the central office switch into a particular neighborhood or business location. A remote digital terminal ("RDT") is placed at a remote location from the central office and is connected to it via a fiber-optic cable, or some other high-bandwidth connection. The remote digital terminal receives PCM-modulated voice information from the central office switch, converts the digital PCM signals into analog voice signals, and routes the analog voice signals to a particular customer location via a plurality of line-cards that connect the RDT to the customer's location. Similarly, the RDT converts analog voice information from the customer to a digital PCM format for transport back to the central office switch. An example of a digital loop carrier system is set forth in U.S. Pat. No. 5,046,067 ("the '067 patent"), which is assigned to the assignee of the present invention. The teaching of this patent is hereby incorporated into the present application by reference.

The RDT typically includes an interface terminal for communicating with the central office over the fiber-optic connection, a common equipment shelf for housing equipment that is capable of exchanging PCM voice signals with a digital switch at the central office and that can also demultiplex high-bandwidth signals (such as DS-1 signals) into lower-bandwidth signals (such as DS-0) signals, and a plurality of copper shelves for housing line-cards (also known as channel units). The line-cards convert the PCM digital voice signals from the common equipment shelf into analog signals, and vice versa, for each customer that is connected to the RDT.

Dial-up Internet access is a presently available technique for transporting data to local customers. This mode of data communication transmits digital data over an analog voice line using a low-frequency (voice range) modem. Presently, the highest-bandwidth that such modems are capable of communicating is about 53 Kbps. This is not sufficient for many Internet applications, such as video-conferencing, interactive gaming, large file downloads, etc.

Another presently available technique for transporting data to a local user is via a dedicated digital line, such as a T-1 line, or an ISDN line. Although these alternatives provide higher-bandwidth capabilities than an analog modem, they are very costly to the average consumer, and therefore have met with minimal market penetration.

Recently, a series of new techniques for transporting data over voice lines, known as digital subscriber line (or DSL) have been proposed. DSL technologies use advanced digital modulation schemes to transport orders-of-magnitude more information over copper phone lines than analog modems or ISDN lines. The primary mechanisms for achieving such high throughput are higher-frequency transmission and advanced modulation schemes. Because of the promise of higher transport speeds, DSL is very desirable for Internet applications. In addition, DSL technology should be available at a fraction of the cost of dedicated T-1 lines, since no dedicated link is required.

Regardless of what DSL technique is implemented, problems exists with integrating DSL technology into existing digital loop carrier systems. Power is a primary concern. Typical DSL technologies require 4–8 watts per line-card to operate the complicated modulation algorithms, thus limiting their applicability to existing DLC installations, which are power-limited. Limited range is another concern. Some customers are at significant distances from the RDT, and if the DSL line-card range is limited, then additional hardware may be required to connect to a particular customer that is far from the RDT. Noise introduced into the system is yet another concern. But perhaps the most vexing problem is how to adapt the existing DLC infrastructure to support high-bandwidth digital data without reducing the voice-bandwidth capabilities of the system, or without having to replace the RDT equipment already installed in the field. The present invention solves this problem, as well as many others.

Thus, there remains a general need in this field for a system and method for integrating DSL capabilities into existing DLC systems.

There remains a more particular need for such a system and method in which an auxiliary bus is converted into a digital data bus for transporting data directly between the interface terminal and the DSL line-cards in the RDT, thereby bypassing the common equipment shelf and minimizing the impact to the voice-carrying capabilities of the DLC system.

There remains an additional need for such a system and method in which multiple digital signals from the DSL line-cards are switched at the RDT, prior to transmission to the central office switch.

There remains yet another need in this field for a combination voice/DSL line-card for use in a DLC system.

There remains still another need for such a combination voice/DSL line-card that utilizes low-power modulation technology, such as quadrature-phase shift keying ("QPSK").

SUMMARY OF THE INVENTION

The present invention overcomes the problems noted above and satisfies the needs in this field for a digital loop carrier system that is capable of transporting both voice and DSL data signals. The digital loop carrier system includes a remote digital terminal having an interface terminal, a common equipment shelf for interfacing digital voice signals to the central office switch, and at least one copper shelf coupled to the common shelf for holding voice line-cards that convert digital voice signals into analog voice signals (and vice versa) for transport to customer premises. At least one copper shelf is configured to include an auxiliary digital data bus (preferably a packet data bus) for connecting combination voice/DSL line-cards and at least one data uplink card. The data uplink card is coupled directly to the interface terminal-to enable DSL data transport without impacting digital voice capabilities through the common equipment. Also disclosed is an optional Ethernet switch in the remote digital terminal for concentrating multiple DSL signals prior to transport back to the central office.

As described in more detail below, the present invention can be used with any DSL modulation scheme. However, because of the inherent power limitations of existing DLC installations, the preferred embodiment of the present invention utilizes a low-power QPSK-modulation technique. It is to be understood that this is only one example of the many types of modulation schemes that could be integrated into the combination voice/DSL line-cards, and the overall system of the present invention.

One embodiment of the present invention provides a system for transporting voice and digital subscriber line (DSL) data in the local telephone loop, comprising: (a) a central office switch coupled to voice and data sources; (b) a plurality of customer interface devices; and (c) a remote digital terminal (RDT) coupled between the central office switch and the customer interface devices, comprising: (1) an interface terminal for communicating voice and data signals between the central office switch and the RDT; (2) a common equipment shelf coupled to the interface terminal for transmitting and receiving voice signals; and (3) at least one copper equipment shelf coupled to the common equipment shelf, the copper equipment shelf including a plurality of communication cards and a digital data bus for transporting data between the cards, wherein one of the communication cards is a data uplink card coupled to the interface terminal for transmitting and receiving data signals, and another one of the communication cards is a combination voice/DSL card for transmitting voice and data signals between at least one of the customer interface devices and the RDT.

Another embodiment of the present invention provides a method of transporting voice and data in a digital loop carrier system, comprising the steps of providing a remote digital terminal in communication with a central office switch and a plurality of customer interface devices, the remote digital terminal having a interface terminal, at least one common equipment shelf, and at least one copper shelf, receiving voice and data information from the central office switch at the interface terminal; routing the voice information through the common equipment shelf and the copper shelf to the plurality of customer interface devices; and routing the data information directly to the copper shelf and then onto the plurality of customer interface devices.

Another embodiment of the present invention provides a remote digital terminal for use in a digital loop carrier system, comprising: an interface terminal; a common equipment shelf coupled to the interface terminal; a copper equipment shelf coupled to the common equipment shelf, including: at least one combination voice/DSL line-card; at least one data uplink card coupled to the interface terminal; and a digital packet data bus; wherein voice signals are routed from the interface terminal to the common equipment shelf and then to the combination voice/DSL line-card, and data signals are routed from the interface terminal to the data uplink card and then to the combination voice/DSL line-card.

The present invention also provides an improved digital loop carrier system including a remote digital terminal having an interface terminal, at least one common equipment shelf for interfacing voice signals to a central office switch via the interface terminal, and at least one copper shelf coupled to the common shelf for housing line-cards that convert digital voice signals into analog voice signals for transport to customer locations, the improvement comprising: at least one combination voice/DSL line-card housed in the copper shelf for communicating voice and data signals to a customer location; at least one data uplink line-card housed in the copper shelf for communicating data signals to the combination voice/DSL line-card; and a digital data bus for connecting the combination voice/DSL line-card to the data uplink line-card.

Another embodiment of the present invention provides a remote digital terminal for transporting voice and data signals between a central office switch and a plurality of customer premises, comprising: a plurality of combination voice/DSL line-cards for transporting voice and data signals to a customer premises; means for routing voice signals from the central office switch to the plurality of combination voice/DSL line-cards; and means, separate from the means for routing voice signals, for routing data signals from the central office switch to the plurality of combination voice/DSL line-cards.

The present invention also provides a novel combination voice/DSL line-card. One embodiment of this combination voice/DSL line-card includes: a PCM voice signal interface; voice-frequency channel circuitry coupled to the PCM voice signal interface for transporting voice signals; a digital data bus interface; and DSL channel circuitry coupled to the digital data bus interface for transporting data signals.

Another embodiment of the voice/DSL line-card includes: means for receiving digital PCM voice signals; means for converting the digital PCM voice signals into analog voice signals; means for receiving digital data signals; and means for converting the digital data signals into DSL-modulated data signals. These are just some of the embodiments of the present invention described in more detail below in connection with the drawing figures. Other embodiments not specifically disclosed or described would be apparent to one of ordinary skill in this art.

The present invention provides many advantages over presently available techniques for transporting voice and digital data in the local loop, particularly when applied to DSL transport over existing DLC systems. Not all of these advantages are simultaneously required to practice the invention as claimed, and the following list is merely illustrative of the types of benefits that may be provided, alone or in combination, by the present invention. These advantages include: (1) existing DLC systems can be easily and cost-effectively upgraded to the present invention; (2) the preferred QPSK modulation scheme provides low power in comparison to other presently known DSL techniques; (3) voice and data services are combined on a single line-card; (4) DSL data services can be added or designed-into a DLC system without impacting the voice carrying capabilities of the system; (5) DSL data can be combined at the RDT prior to transmission to the central office switch; and (6) different types of DSL technologies can be integrated into the same DLC system.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE DRAWINGS

Figure 1:
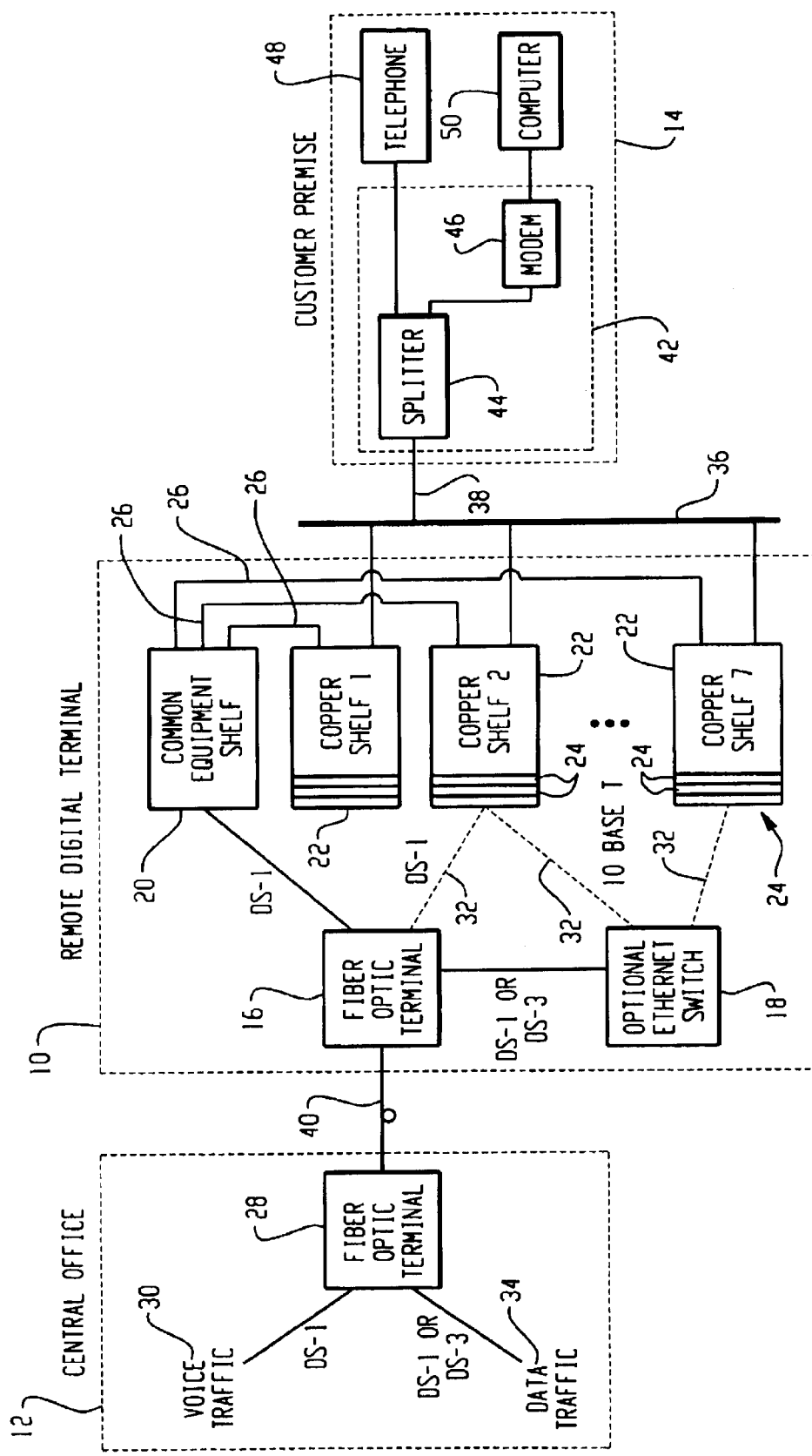
FIG. 1 is block diagram of a preferred digital loop carrier system capable of transporting voice and DSL data services in the local loop.

Referring now to the drawings, FIG. 1 sets forth a block diagram of a preferred digital loop carrier system capable of transporting voice and DSL data services in the local loop. This system includes central office equipment 12, at least one remote digital terminal 10, and customer premises equipment 14. The central office equipment 12 includes at least one source of voice information 30, such as POTS ("Plain Old Telephone Service") lines from a local digital switch (not shown), at least one source of digital information 34, and a fiber optic terminal 28 connected to the voice traffic and data traffic information 30, 34. The POTS lines 30 provide a source of voice information, and are typically PCM-modulated DS-0 or DS-1 lines, but could be other sources of voice information. The source of digital information could be a 10 Base-T data source, such as from an Internet server, or could be a DS-1 frame relay or ATM signal. The fiber optic terminal 28 couples the voice and data traffic to at least one fiber optic cable 40 for distribution to the remote digital terminal(s) 10 of the DLC system. (Refer to U.S. Pat. No. 5,046,067, which has been incorporated by reference to this disclosure, for a more detailed description of this type of equipment.)

As described in the background section of this application, the purpose of the digital loop carrier system is to extend the digital signal capabilities of the digital telephone network, which typically ends at the central office switch 12, into the field to a point closer to the customer premises 14. This provides numerous advantages, the primary one being that only a few number of optical fibers need to be extended out from the central office instead of thousands of pairs of copper wires, due to the high-bandwidth signal capacity of the fiber. Presently available digital loop carrier systems are primarily designed to transport PCM digital voice signals to and from the central office on the one hand, and analog voice signals to and from the customer premises on the other hand. The bandwidth of information capable of being transported by the digital loop carrier system is typically constrained by the capabilities of the common equipment in the RDT that interfaces to the PCM-modulated voice information from the central office. The voice-bandwidth of the RDT would be further constrained if high-speed data cards were added to the system. Although this is possible to do with existing DLC systems, it would mean a reduction in the PCM voice-carrying capabilities of the network, which is undesirable.

The present invention shown in FIG. 1 overcomes this problem by configuring an auxiliary bus in the remote digital terminal 10 as a special packet data bus, and by routing digitally modulated data signals, such as DSL data, directly from the customer premises equipment 14 to the central office and bypassing the common equipment 20 of the RDT 10. In this manner, DSL capabilities-can be added to an existing DLC system without impacting the PCM voice-carrying capabilities of the network. As described in more detail below, the present invention provides many other benefits and enhancements over presently known DSL delivery systems in the local loop.

The preferred DLC system shown in FIG. 1 includes at least one remote digital terminal 10, although it could include many such terminals. The RDT 10 includes a fiber-optic interface terminal 16, an optional Ethernet switch 18, at least one common equipment shelf 20, one or more copper shelves 22, each copper shelf including a plurality of slots 24 for receiving line-cards and a backplane (not shown in this figure) that each line-card plugs into, and one or more ribbon cables 26 that couple the copper shelf 22 to the common equipment shelf 20.

In a typical DLC system, the PCM voice data from the central office 12 is received from the fiber optic line 40 by the fiber-optic interface terminal 16 and converted from an optical signal, such as an OC-3 signal, into an equivalent electrical signal. This signal is then routed to the common equipment as one or more DS-1 signals, or a DS-3 signal, or some other equivalent electrical signal. The common equipment shelf 20 typically includes termination points for the DS-1 signals from the central office, each DS-1 providing 24 DS-0 PCM-modulated phone links. These DS-0 voice channels are then distributed to the various line-cards in the one or more copper shelves 22 via ribbon cables 26. The common equipment shelf also includes power circuitry for powering the common equipment as well as the copper shelves 22, circuitry for detecting when a DS-1 line has failed, and circuitry for handling system alarms and maintenance, troubleshooting functions, inventory control functions, testing, and many other functions that are central to the DLC system. The '067 patent provides further information on this functionality.

The fixed-bandwidth of the common equipment shelf 20 determines how much voice information can be carried through a particular RDT via the line-cards plugged into the one of more, copper shelves 22. Each copper shelf 22 is a chassis that includes a backplane having many traces and a plurality of multi-pin connectors into which the line-cards are plugged. The same traces on the copper shelf backplanes are also preferably connected to the common equipment shelf 20 via the various ribbon cable connections 26. In this manner, the common equipment 20 can communicate PCM voice signals to any of the line-cards in any of the copper shelves 22.

Preferably, there is one line-card (or channel card) for each customer premises 14. The PCM voice signals for a particular customer are routed from the common equipment shelf 20 over the ribbon cable 26 to the backplane of a copper shelf 22, and then to the line-card for the particular customer. The line-card converts the PCM digital voice information into an analog voice signal and routes that signal on a twisted-pair copper connection.38 to the customer premises 42. At the customer premises, the analog voice signal is typically terminated at a network-interface device ("NID") 42 and routed to the telephones.(or other customer interface devices) on the customer's premises. Also shown in FIG. 1 is a copper cross-connect 36. This is a wiring distribution box that cross-connects a large number of bundled twisted-pair connections from the RDT to numerous smaller bundles of connections for local routing.

The present invention improves upon this existing DLC architecture for routing voice signals by providing the one or more copper shelves 22 with an auxiliary digital bus that is preferably configured as a digital packet data bus, and by providing two types of special data cards, a combination voice/DSL line-card and a digital data uplink card. The configuration of the digital packet data bus and its operation are described in connection with FIGS. 2, 6 and 7, below, and a preferred QPSK-modulation voice/DSL line-card is described in connection with FIGS. 3, 4 and 5.

The combination voice/DSL line-card 52 and the digital data uplink card 91 plug into the one or more copper shelves. There is one combination voice/DSL line-card 52 for each customer that wants not only voice service, but high-speed DSL service as well. It is important to note at this point that although the preferred modulation scheme described in this application is a QPSK scheme, the present invention includes any type of DSL modulation, including, but not limited to-discrete multi-tone ("DMT"), carrier-amplitude and phase modulation ("CAP"), or multiple-virtual line ("MVL"). These are just a few of the presently known DSL modulation schemes that could be incorporated into line-cards for use with the present invention. The primary reason that QPSK modulation is disclosed as the preferred embodiment is because it is a very low-power modulation scheme, and for large RDT installations that could have as many as 2000 line-cards, power-consumption is a critical issue for successful deployment of a DSL system.

The digital data uplink card 91 could be either a DS-1 or Ethernet (or some other type of) uplink card that communicates over the auxiliary packet data bus on the backplane of the copper shelf 22 to the various combination voice/DSL line-cards 52. This card 91 is coupled to the fiber optic interface terminal so as to provide a digital data transport path 32 that bypasses the PCM voice circuitry of the common equipment shelf and therefore does not impact the PCM voice-carrying capabilities of the RDT. The packet data transported over the packet data bus from the voice/DSL line-cards is converted by the uplink card 91 into a DS-1 format, or could simply be passed along to an optional Ethernet switch 18, if the data packets are already in Ethernet format. The purpose of the optional Ethernet switch 18 is to concentrate 10 Base-T level signals from various uplink cards prior to communication over the optical fiber 40, in order to optimize bandwidth. The output of the optional Ethernet switch 18 is preferably a DS-1 or DS-3 signal, but it could, alternatively, be a 100 Base FX signal over fiber 40, or a separate fiber (not shown) back to the central office, or it could be a wavelength-division multi-plexed signal ("WDM") over the same fiber 40 as the PCM voice information is transmitted.

By providing a special-purpose digital packet data bus and special-purpose line-cards for transporting both voice and DSL signals over the copper shelf backplane, and by bypassing the common equipment shelf 20 for the DSL data, the present invention provides-the-ability to add high-speed DSL capabilities to the existing DLC infrastructure without impacting the PCM voice carrying capabilities of the system.

Assuming that the system in FIG. 1 is configured as described above with the digital packet data bus and the special-purpose line-cards, the twisted-pair copper connections 38 to the customer premises 14 can then be used to transport both low-bandwidth voice signals and high-bandwidth DSL data signals. These signals are terminated at the NID 42, which may include a splitter 44 for splitting the voice information from the data information, and a DSL modem 46 for demodulating the DSL signal into some other electrical signal that is compatible with a typical computer interface 50. The voice signal is routed to the internal phone connections 48. Having the splitter.44 and modem 46 in the NID is optional. In some forms of DSL, such as the so-called "g.lite" modulation, a splitter is not needed. Alternatively, the splitter could be external to the NID, or it could be incorporated into some type of DSL terminal that includes the splitter and the modem. This equipment could be either inside the computer 50, or connected nearby. The exact configuration of the NID and the customer premises equipment is not important to the present invention. It is only described in order to convey a complete understanding of the inventive system.

Figure 2:
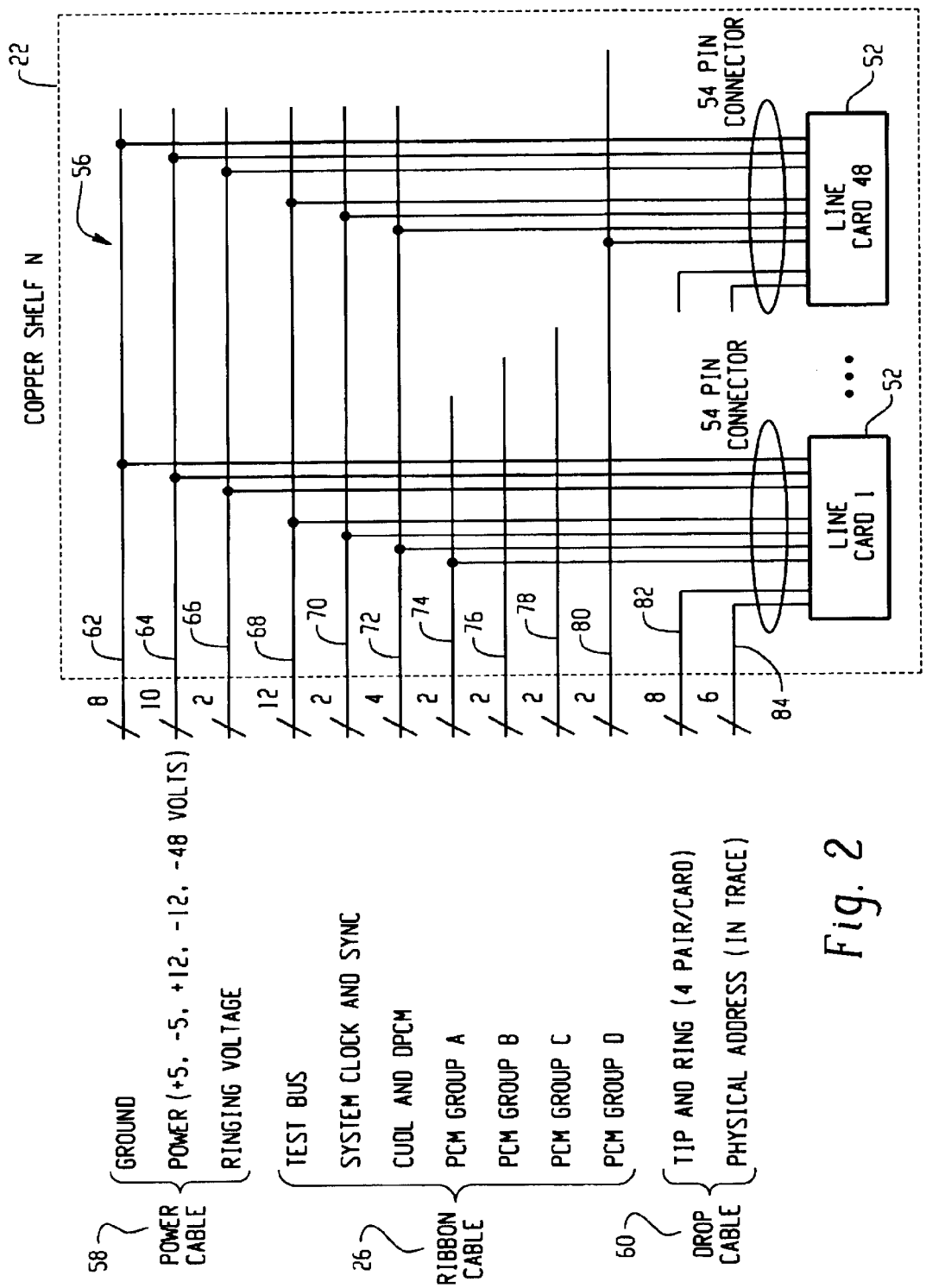
FIG. 2 is a preferred backplane structure diagram of one copper shelf in the remote digital terminal of the system in FIG. 1, including an auxiliary packet data bus.

FIG. 2 is a preferred backplane 56 structure diagram of one copper shelf 22 in the remote digital terminal 10 of the system in FIG. 1, including pins 68 that form the auxiliary packet data bus over which the DSL data packets are transported from the combination voice/DSL line-cards to the data uplink cards. The preferred copper shelf 22 includes a backplane 56 having numerous connections. As shown in FIG. 2, there are preferably 54 connections, although the number of connections could be higher or lower depending on the application and the particular DLC system. There are preferably 48 slots in each copper shelf for receiving line-cards 52, although, alternatively there could be any number of slots. Each line-card 52 plugs into the chassis and the backplane 56 of the copper shelf 22 via a connector 54. This connector preferably includes 54 connections that match with the 54 connections of the backplane 56. Again, these numbers are arbitrary, and are only described for purposes of the exemplary system shown in the drawings.

The 54-pin backplane preferably includes eight ground signals 62, ten power signals 64, two ringing voltage signals 66, a twelve-pin test bus 68, two-pins for system-clock and sync 70, four pins for the Channel Unit Data Link ("CUDL") and DPCM information 72 (refer to the '067 patent for more information on these signals), eight pins for the PCM voice signals 74–80, eight pins for the tip/ring signals 82, and six pins for physical address 84. These bus signals on the backplane 56 are connected externally to the copper shelf by power cable 58, ribbon cable 26, and drop cable 60. The power cable 58 and the ribbon cable 26 are preferably connected to the common equipment shelf 20. The digital PCM voice information is transported between the common equipment shelf 20 and the copper shelf 22 via the ribbon cable 26. These voice signals are then routed over the backplane 56 to the appropriate line-cards 52 for conversion to analog signals and transport to the customer premises.

The test bus 68 is an auxiliary bus. It does not normally function to provide active services to customers, but is only used in certain situations where a system problem has occurred that requires testing. At least 4 of the test bus pins are not used at all. Therefore, this bus is the type of connection that could be configured to provide another function. In the present invention, this function is the digital packet data bus that connects the combination voice/DSL line-cards to the digital data uplink cards.

Although a particular type of packet data bus is preferably used with the present invention, as described in more detail below with reference to FIGS. 6 and 7, it is to be understood that other types of digital bus protocols could be implemented using these pins, such as a multi-point HDLC (High-level Data Link Control) signaling scheme. HDLC is a bit-oriented, synchronous protocol that applies to the data-link layer (layer 2 of the ISO/OSI model) for computer-microcomputer communications. Messages in HDLC are transmitted in units called frames, which can contain differing amounts of data but which are organized in a particular way. This is just one additional example of the type of signaling scheme that could be implemented to transfer the DSL digital information.

Although in the preferred embodiment an existing bus (i.e. the test bus) is configured as a digital packet data bus, alternatively, the system of the present invention could be designed from the beginning to include a special-purpose digital data bus on the copper shelf backplanes 56 that enable data to be routed directly to the interface terminal 16 and bypassing the common equipment shelf 20. Or, alternatively, a special digital data bus could be implemented through the ribbon cable connecting the copper shelves to the common equipment shelf and special digital packet data handling circuitry could be built into the common equipment. Other embodiments and configurations of the digital packet data bus are possible and are within the scope of the invention.

Figure 3:
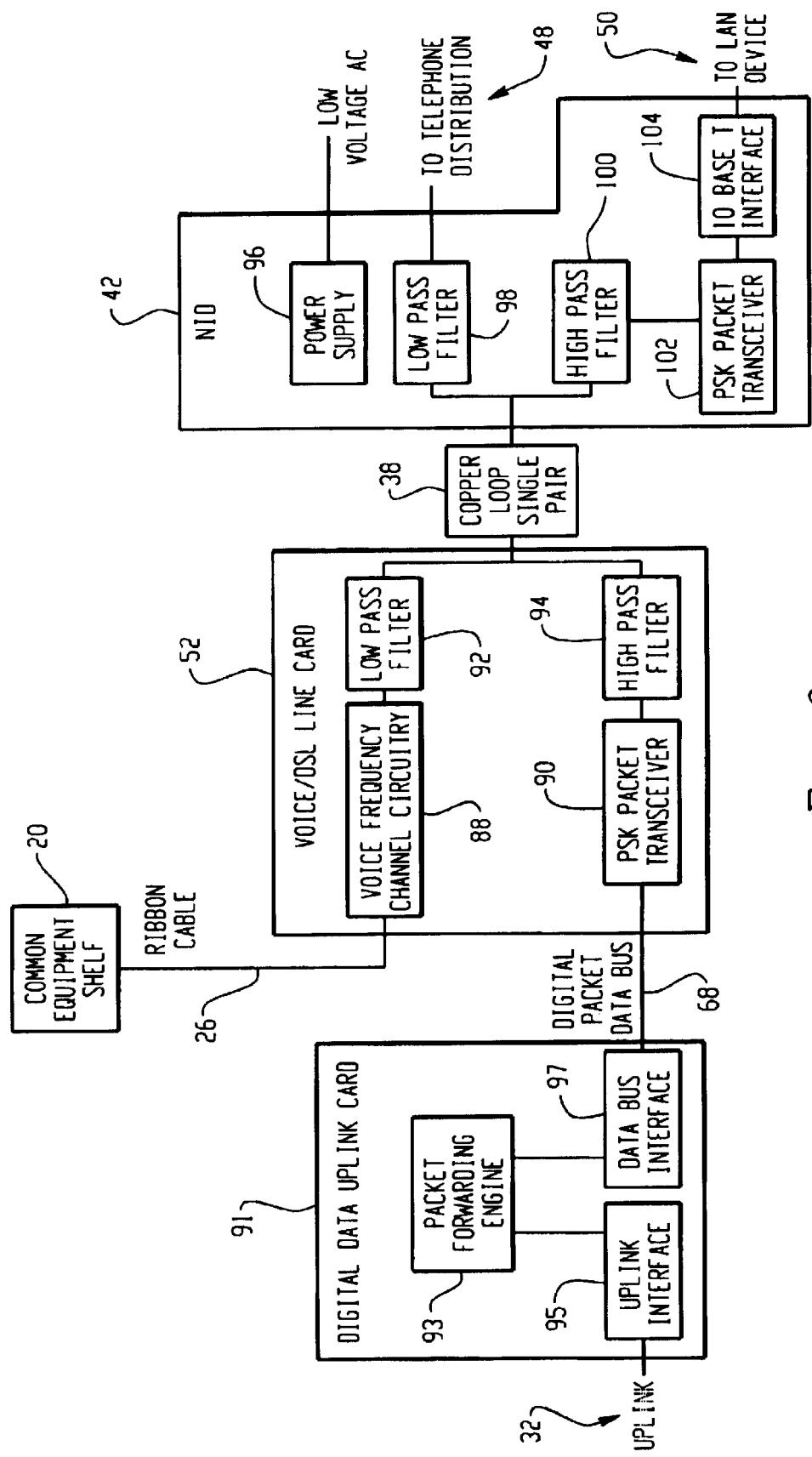
FIG. 3 is block diagram of a preferred combination voice/DSL line-card installed in one of the copper shelves of the remote digital terminal connected to a corresponding network interface device ("NID") at the customer premises for delivering voice and DSL data services over a single copper pair.
Figure 4:
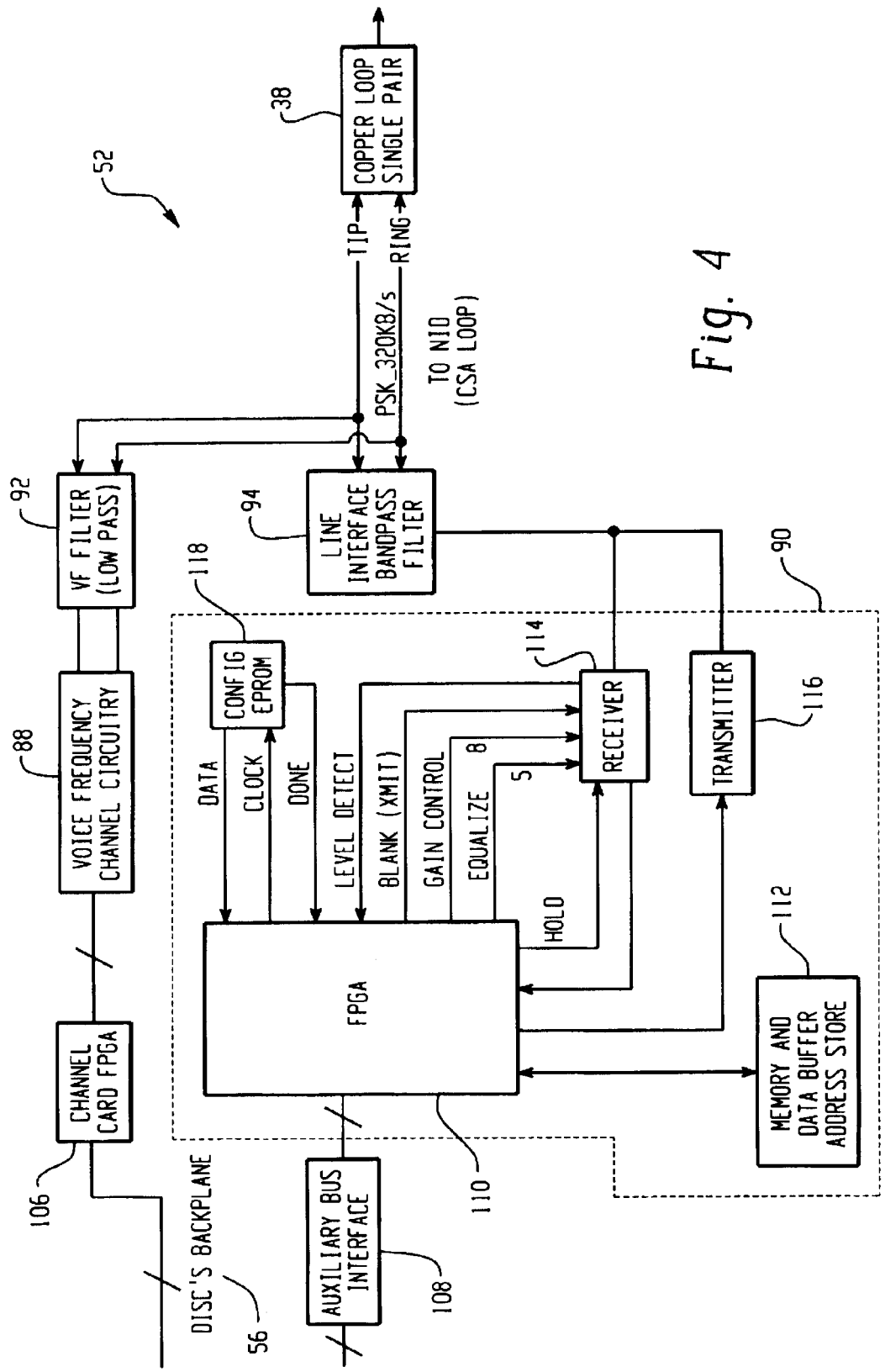
FIG. 4 is an expanded block diagram of the preferred combination voice/DSL line-card in FIG. 3.
Figure 5:
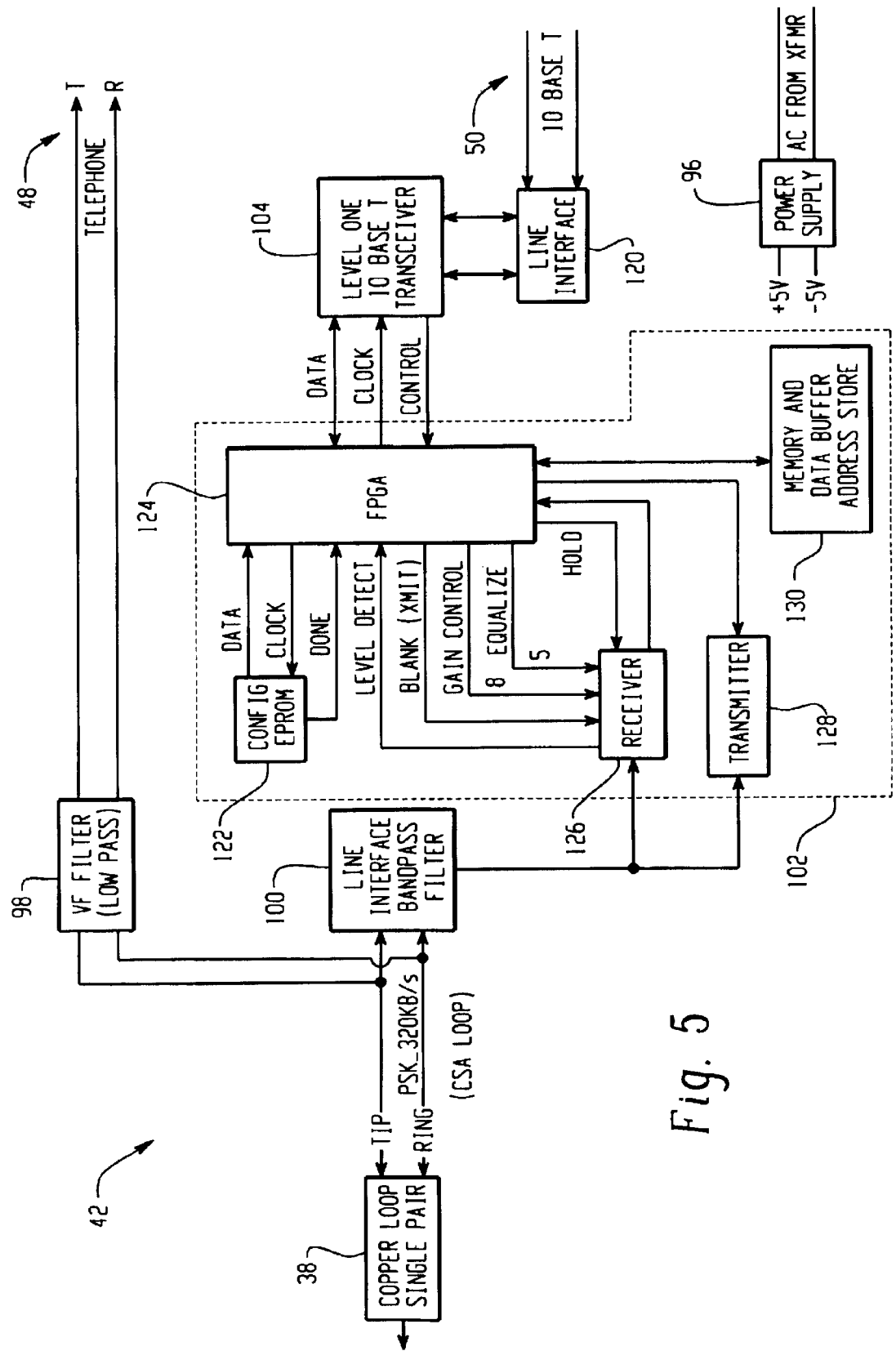
FIG. 5 is an expanded block diagram of the preferred NID corresponding to the preferred combination voice/DSL line-card in FIG. 3.

Turning now to FIGS. 3, 4 and 5, these figures show a preferred example of implementing DSL over voice lines using QPSK modulation. As noted previously, the use of QPSK modulation as the DSL scheme is only the preferred embodiment of the invention and unless specifically limited, the claims and coverage of this application are not limited to any particular DSL technology. QPSK, or Quadrature Phase Shift Keying is a modulation scheme that is known in the art. The exact details of this scheme will not be described herein since they are known to one of ordinary skill in this art, as are the other DSL modulation schemes mentioned in this application, such as DMT, QAM, MVL, and others. (For more information on DSL modulation schemes, refer to Leon W. Couch II, *Digital and Analog Communication Systems*, Macmillan Publishing, 1993, in particular the following pages—QPSK at pp. 387–388, 391–393; QAM at pp. 389–393; PCM at pp. 142–145; HDLC at pp. 776–77; etc.) A key advantage to using QPSK, particularly in conjunction with the present invention, is that it is an inherently low power technology. In addition, a high signal-to-noise ratio is not required in QPSK. This is very important for telephony applications were noise immunity is typically a limiting factor.

FIG. 3 is a block diagram of the connections between a preferred combination voice/DSL line-card 52 installed in one of the copper shelves 22 and the NID 42 at the customer premises, on the one hand, and the digital data uplink card 91 and the common equipment shelf 20, on the other hand. The purpose of the combination voice/DSL line-card 52 is to convert and transport voice and data information back and forth between the customer premises equipment 52 and the voice and data interface equipment 91, 20 in the RDT. FIG. 4 is an expanded block diagram of the preferred combination voice/DSL line-card 52 in FIG. 3, and FIG. 5 is an expanded block diagram of the preferred NID 42 corresponding to the preferred combination voice/DSL line-card 52 shown in FIG. 3.

FIG. 3 shows the preferred combination voice/DSL line-card 52 according to the present invention. This card 52 plugs into the backplane 56 of one of the copper shelves 22. The PCM digital voice information coming into and going out from this card is transported over backplane pins 74–80 to the ribbon cable 26 and onto the common equipment shelf 20, where this information is combined with other PCM data and passed onto or received from the fiber interface terminal 16. The QPSK-modulated DSL data is transported over the auxiliary data bus pins 68, which have been configured to operate as a packet data bus, to the digital data uplink card 91.

The digital data uplink card 91 preferably includes a data bus interface 97 for interfacing to the digital packet data bus 68, an uplink interface 95 for interfacing either to the fiber optic terminal 16 of the RDT or to an optional Ethernet switch 18 via uplink 32, and a packet forwarding engine 93 for managing the transport of data packets to and from the combination voice/DSL line-cards 52 and the uplink interface 32. The packet forwarding engine 93 also manages the conversion of packets from Ethernet to DS-1 and vice versa, in the case where the uplink 32 is directly coupled to the fiber optic terminal 16, and may also be capable of converting from one packet type to another in the case where the format of the data on the digital packet data bus 68 is not already in Ethernet format. The packet forwarding engine 93 could be either an embedded microprocessor or microcontroller (including associated memory and support circuitry) operating under software control, or, alternatively could be implemented as an FPGA or other programmable logic device for higher-speed operation.

The preferred combination voice/DSL line-card includes a connector 54 for interfacing the card to one of the backplanes 56 in one of the copper shelves 22, voice frequency channel circuitry 88, a QPSK packet transceiver 90, a low pass filter, and a high pass filter 94. The voice frequency channel circuitry converts the PCM digital voice information from the PCM data lines on the backplane 74–80 into analog signals and transports them through low-pass filter 92 (to remove high-frequency components that could disturb the DSL signals) onto a copper-loop single twisted-pair 38 to the NID 42 at the customer premises.

The QPSK packet transceiver 90 receives and transmits DSL modulated data (preferably in QPSK form, but alternatively in any other high-frequency digitally modulated fashion) between the NID and the auxiliary digital packet data bus 68 of the copper shelf backplane 56. Once on the packet data bus, this information is routed to a digital-data uplink card and then coupled onto the central office via the fiber optic terminal 16 and the fiber cable 40 connecting the remote digital terminal 10 to the central office. The DSL information could be converted into either a DS-1 type signal, or an optional Ethernet packet, prior to coupling to the fiber optical interface terminal 16. The high-pass filter 94 prevents the QPSK circuitry from interfering with the voice circuitry. In this manner, a special-purpose combination card is provided that includes both low-frequency voice channel capabilities and high-frequency DSL capabilities in a single line-card.

At the other end of the twisted-pair connection 38 is the customer premises 14. This may include a NID 42 that may in turn include circuitry for interfacing with the combination voice/DSL line-card 52. Alternatively this circuitry could be external to the NID, closer to the customer's interface devices (telephone, fax machine, computer, etc.) The interface circuitry includes a low pass filter 98, a high-pass filter 100, a QPSK packet transceiver 102, and, optionally, a 10 Base-T interface 104. Also shown in the NID 42 is an optional power supply 96 that is connected to a low voltage AC source at the customer premises. This power supply 96 converts the 120VAC line voltage from the customer's premises into a set of DC voltages for operating the equipment in the NID.

The low-pass filter 98 filters away the high-frequency DSL information and only passes the lower-frequency analog voice information for distribution to the internal telephone network 48 at the customer location. Similarly, the high-pass filter 100 filters away the low-frequency voice information and only passes the higher-frequency DSL data information. This DSL data is then converted into some non-modulated form, such as 10 Base-T Ethernet packets, or some other type of signal, by the QPSK packet transceiver 102. The filters and transceiver in the NID are similar in design to those in the combination voice/DSL line-card 52. The output of the QPSK transceiver 102 is then passed on to an optional 10 Base-T Ethernet interface, or some other type of digital interface, for distribution to an internal LAN, such as an Ethernet network, or for direct connection to a computer, fax machine, or other device. As noted above, all of the circuitry shown in the NID could be external to this device, and, in particular, could be installed in an external or internal device located in a computer or other device within the customer premises.

FIG. 4 shows an expanded block diagram of the circuitry in the preferred combination voice/DSL line-card. This circuitry includes the QPSK packet transceiver 90, high-pass filter 94, low-pass filter 92 and voice frequency channel circuitry 88, which have been discussed. Also shown in this diagram are the connections to the copper shelf backplane 56 on the one hand, and the copper loop single twisted pair 38 on the other. This diagram is expanded to show that the preferred QPSK packet transceiver includes a Field Programmable Gate Array ("FPGA") 110, a memory buffer 112, a configuration EPROM 118, a receiver 114 and a transmitter 116. Also shown in this diagram is an Aux. Bus interface circuit 108 (shown in more detail in FIG. 6), and a channel card FPGA 106.

PCM voice information is transported in the upper path of the card 52, and DSL digital data is transported in the lower path. Voice information from the PCM pins on the backplane 56 is connected to the channel card FPGA 106, which is a controller that determines whether the data is for this particular card, and includes circuitry for extracting voice information from the bus and transmitting information back onto the bus. From the channel card FPGA 106, the extracted voice information is passed to the voice-frequency channel circuitry 88, which, as noted above, converts the PCM digital voice information from the PCM data lines on the backplane 74–80 into analog signals and transports them through low-pass filter 92 (to remove high-frequency components that could disturb the DSL signals) onto a copper-loop single twisted-pair to the NID 42 at the customer premises. In similar fashion, analog voice information from the customer premises 42 is transported over the copper-loop single twisted-pair 38 to the card 52, is filtered 92, converted into a digital PCM signal and transmitted onto the backplane 56.

The digital DSL information is transported on the lower path. First we will consider the forward path, where information is being transmitted from the central office switch 12 to the customer premises 14 through this combination line-card 52. The digital information from digital source 34 is transmitted on fiber 40 to the fiber optic terminal 16 of the RDT 10. From here, the information is preferably down-linked 32 as a DS-1 signal to a digital uplink data card 91 installed in one of the copper shelves 22. (Although, as noted in FIG. 1, this information could be converted into some other format, such as Ethernet, within the RDT, and then routed to the digital data uplink card 91 as a 10 Base-T type of signal.) The uplink card 91 then broadcasts this information onto the auxiliary data bus 68 in packet bursts. These packets are routed to the proper line-card 52 and are received by auxiliary bus interface circuitry 108.

Once on the card, these packets are then transmitted to the FPGA 110. The FPGA 110 provides many functions. It controls the receipt and transmission of DSL data through the card by communicating with receiver 114 and transmitter 116. Various signals such as "level detect," "blank (xmit)," "gain control," "equalize," and "hold" are used to control these circuits. The FPGA 110 also controls the conversion from packet data (or whatever form of data is being transmitted on the auxiliary data bus) to DSL-modulated data. The preferred DSL modulation scheme is QPSK. The QPSK modulated data is then transmitted via transmitter 116, through high-pass filter 94 and onto the copper loop single twisted-pair 38. The frequency of transmission of this QPSK signal is on the order of 320 KB/s, which is roughly an order of magnitude greater than current analog modem technologies. The FPGA also utilizes an external memory 112, which is used as a store-and-forward buffer for the DSL data, and a configuration EPROM 118, which stores software-reprogrammable configuration information for the DSL part of the line-card 52.

Going in the opposite direction, QPSK-modulated data from the customer premises is filtered by band-pass filter 94, received by receiver 114, and then converted into a non-modulated digital packet data format by FPGA 110 and transmitted out on the auxiliary data bus 68 through bus interface circuitry 108. A state diagram showing the method of operation of the FPGA as it communicates data over the auxiliary packet data bus is shown in FIG. 7.

FIG. 5 is an expanded block diagram showing the corresponding voice/DSL circuitry in the NID 42 at the customer premises 14. This circuitry includes low-pass filter 98, band-pass filter 100, QPSK packet transceiver 102, power supply 96, 10 Base-T transceiver 104 and line interface 120. The low-pass filter 98 passes the low-frequency analog voice information to and from the customer telephone equipment 48. The band-pass filter 100 passes the high-frequency QPSK DSL data signal to and from the customer digital data equipment 50 through the QPSK transceiver 102, 10 Base-T transceiver 104 and line-interface 120.

The circuitry in the QPSK transceiver 102 includes an FPGA 124, which corresponds functionally to the FPGA 110 in the voice/DSL line-card 52, a receiver 126, transmitter 128, a buffer memory 130, and a configuration EPROM 122. These circuits operate in a manner similar to those in the voice/DSL line-card 52. The QPSK DSL information is received by receiver 126, and then is demodulated and converted into a digital data stream, such as a 10 Base-T Ethernet packet stream, by the FPGA 124. This 10 Base-T data is then transmitted to the customer's digital data equipment 50. Similarly, 10 Base-T digital data is converted by the FPGA 124 into QPSK modulated data and transmitted via transmitter 128 out onto the copper loop single twisted-pair 38 and then to the corresponding line-card 52 at the RDT.

Figure 6:
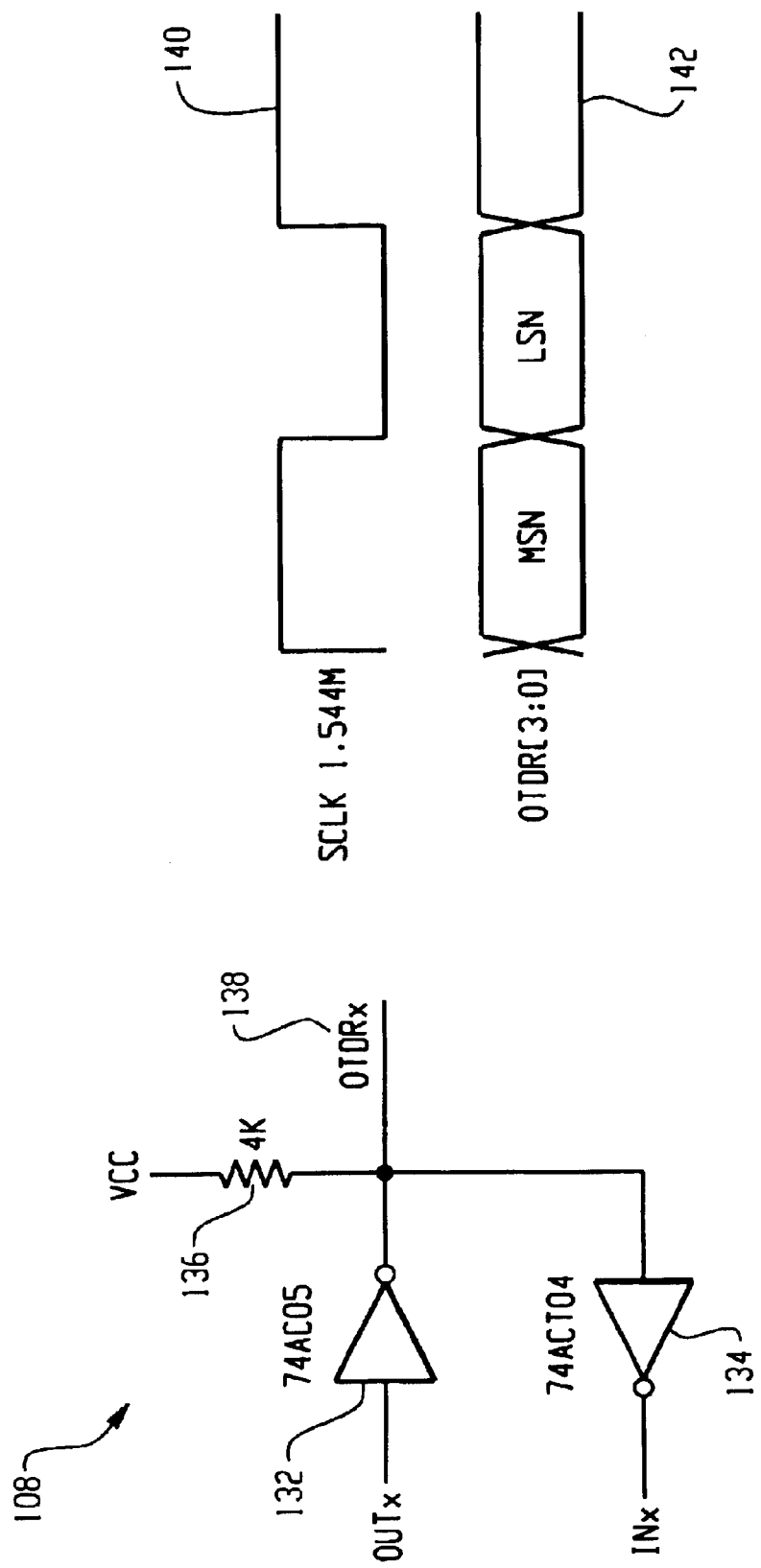
FIG. 6 is a circuit schematic showing the termination scheme of the auxiliary packet data bus set forth in the backplane structure diagram of FIG. 2, and a corresponding timing diagram.

FIG. 6 is a circuit schematic showing the termination scheme of the auxiliary packet data bus set forth in the backplane structure diagram of FIG. 2, and a corresponding timing diagram. FIG. 7 is a corresponding bus state machine diagram. As shown in FIG. 6, the auxiliary packet data bus 68 consists of four pins labeled OTDR[3:0] 142. Because there are 8 bits to transfer on the bus for each data byte in a typical packet (which preferably consists of 64 bytes), the data is transferred on two half-cycles of the system clock (SCLK) 140, which is preferably a 1.544 Mbit clock. The most-significant nibble is transferred in the positive half of the clock cycle and the least significant nibble is transferred in the negative half The preferred digital packet data bus implemented according to FIGS. 6 and 7 is a collision domain bus in which 64 byte packets are transmitted, although, alternatively, other packet sizes could be utilized.

Each line-card that is connected to the auxiliary packet data bus 68 is configured with a pull-up network 108 as shown in FIG. 6. This network includes two inverting buffers 132, 134 connected to OUTx and INx signals, where the OUTx signal is the signal driven onto the bus, and the INx signal is the signal read from the bus, and a pull-up resistor 136 connected between the buffers and a high voltage (VCC). The OTDRx signal is the connection to the auxiliary data bus.

The auxiliary data bus is 4 bits wide in the preferred embodiment, but could, alternatively be less than or greater than this number. Line-cards connected to the bus can start a packet at any time. The state machine circuitry implemented in the FPGA on each card will monitor the bus signal for collisions and stop transmitting immediately if the bus does not match with what is being transmitted. When a collision is detected, the line-card waits for an idle flag plus a delay before attempting retransmission. Packets that are less than 64 bytes will be dropped. There are several flags that are used in the data bus protocol. These are: 0xFF=idle flag; 0x1B=escape flag; and 0x01=start flag.

Figure 7:
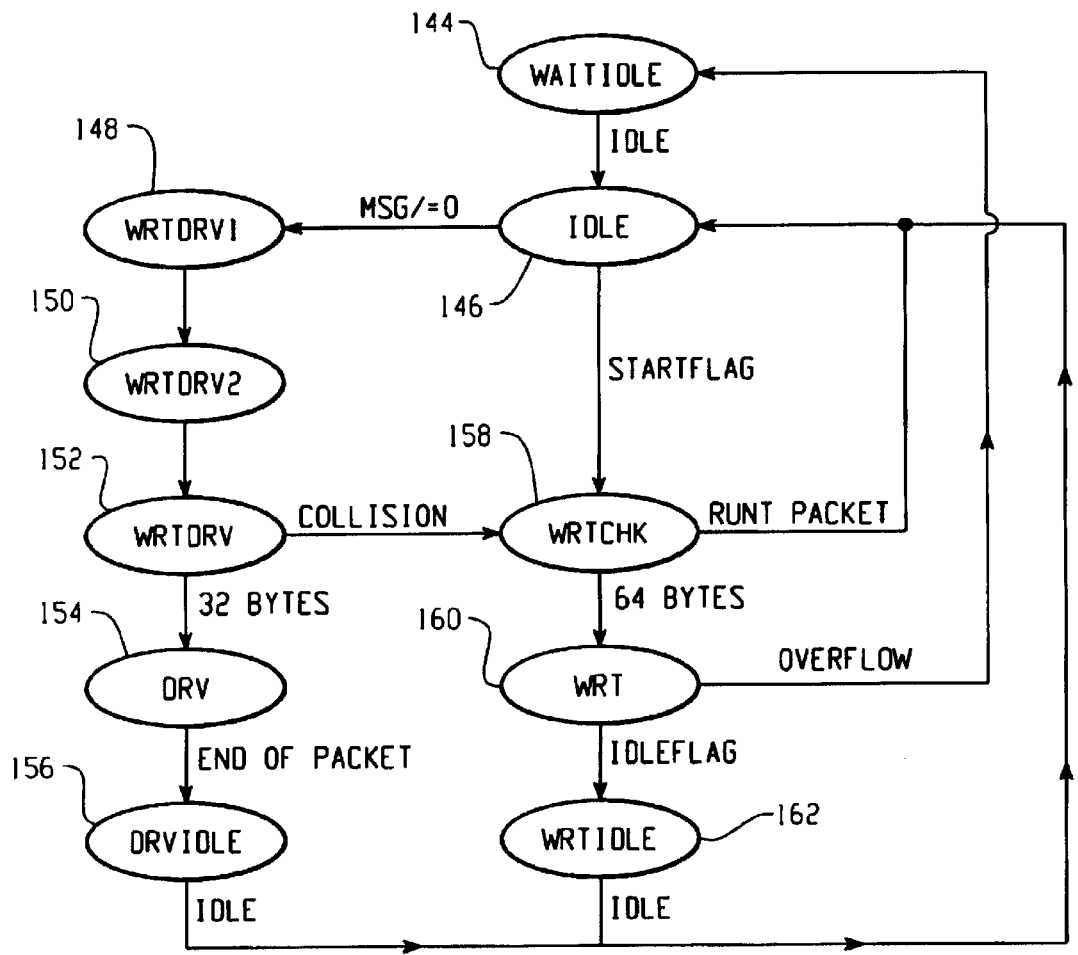
FIG. 7 is a bus state machine diagram of the auxiliary packet data bus.

FIG. 7 sets forth an exemplary state machine, implemented in the FPGA 110 of the line cards, for transmitting and receiving data on the auxiliary packet data bus. When a card is plugged into the chassis of a copper shelf 22 it powers-up in a reset WAITIDLE state 144. In this state, the card is simply waiting for the idle flag to appear on the bus. This is to prevent a new card from doing anything that might disrupt the transmission of a current packet. Once an idle flag is detected, the card moves to the IDLE state 146, and now it is prepared to either transmit or receive data from the bus. If the start flag is detected, then data is being transmitted on the bus by another card, such as a data uplink card. In this case, the card moves into the WRTCHK state 158. In this mode, the card is writing data from the bus into a local memory 112. If 64 consecutive bytes are received, then the card moves into the WRT state, indicating that one complete packet has been received. If, prior to 64 bytes being received in the WRTCHK state, another flag appears on the bus, such as another start flag or an escape flag, then a "runt" packet has been detected. Runt packets are generally caused by collisions (i.e., more than one card trying to transmit data at the same time) or short packets. If a runt packet is detected, then the card cycles back to the IDLE state 146, and waits for the beginning of another transmission or a message to transmit onto the bus.

Assuming 64 bytes were received, the card is in the WRT state 160. From this state, an idle flag would be the next expected signal on the bus. If an idle flag is detected after the 64-byte transmission, this indicates a valid packet. The card then moves to the WRTIDLE state 162. In the WRTIDLE state, a valid packet has been received, and this information is then moved out of memory and processed by the FPGA on the line-card. For example, if it is a packet to be transmitted to the customer premises, the FPGA would modulate the packet data using whatever DSL scheme is implemented in the card, and would then transmit this information onto the twisted-pair connecting the line-card to the customer premises. From the WRTIDLE state 162, control of the bus state machine reverts back to the IDLE state 146. If additional data was received while the card was in the WRT state 160, i.e. instead of an idle flag, more data were received, then an overflow condition has occurred, and control of the bus state machine reverts back to the WAITIDLE state 144, waiting for an idle flag to indicate, that the bad data has been flushed from the bus. In this situation, any data stored in the buffer memory would be discarded.

Writing data to the bus begins when the card detects a non-zero value in a variable, such as a message counter. At this point, the card moves from the IDLE state 146 to the WRTDRV1 state 148. This could be triggered by, for example, data arriving from the customer premises. This data is written to the buffer memory 112 of the line-card 52, and the message counter is incremented. In the WRTDRV1 state 148 a byte is requested from RAM 112 for driving onto the bus. Then in the WRTDRV2 state 150, the start flag (0x01) is driven onto the bus. Control then passes to the WRTDRV state 152, which controls driving the first 32 bytes of data onto the bus. While the data is being driven onto the bus, it is also being re-written into the RAM so that if a collision occurs the data is not lost and can be retransmitted. If, during the first 32 bytes of data driving a collision occurs, then the remaining packet data is not transmitted onto the bus, and control reverts to the WRTCHK state 158 so that the data can be flushed from the bus as noted above.

Assuming that the first 32 bytes are successfully driven onto the bus, which, in general indicates that there will probably not be a collision, then control passes to the DRV state 154 where the remaining 32 bytes are driven onto the bus. Once the packet end is detected, the card moves into the DRVIDLE state 156, and the idle flag is driven onto the bus, indicating to all the other cards that the transmission is over. Control then passes back to the idle state 146.

In one implementation of this packet data bus, the data is broadcast to all of the cards and acted on by each card. In another implementation, special processing functions are built into the FPGA, or some other external processor, that enable each card to detect and act upon only those packets that are meant for that card by detecting the addressing information that is typically stored in each packet. An example of this type of addressing information is the MAC addressing information present in Ethernet-type packets. This is the preferred implementation of the invention.

Having described in detail the preferred embodiments of the present invention, including the preferred modes of operation, it is to be understood that this operation could be carried out with different elements and steps. This preferred embodiment is presented only by way of example and is not meant to limit the scope of the present invention which is defined by the following claims.

What is claimed is:

1. A system for transporting voice and digital subscriber line (DSL) data in the local telephone loop, comprising:

(a) a central office switch coupled to voice and data sources;

(b) a plurality of customer interface devices; and (c) a remote digital terminal (RDT) coupled between the central office switch and the customer interface devices, comprising:

(1) an interface terminal for communicating voice and data signals between the central office switch and the RDT;

(2) a common equipment shelf coupled to the interface terminal for transmitting and receiving voice signals; and (3) at least one copper equipment shelf coupled to the common equipment shelf, the copper equipment shelf including a plurality of communication cards and a digital data bus for transporting data between the cards, wherein one of the communication cards is a data uplink card coupled to the interface terminal for transmitting and receiving data signals, and another one of the communication cards is a combination voice/DSL card for transmitting voice and data signals between at least one of the customer interface devices and the RDT, wherein the voice/DSL card includes: an auxiliary bus interface for interfacing to the digital data bus; a DSL FPGA for converting data signals to and from a DSL-modulated format; a receiver for receiving DSL-modulated signals from a customer interface device; and a transmitter for transmitting DSL-modulated signals to the customer interface device.

2. The system of claim 1, wherein the remote digital terminal further includes a packet switch coupled between the data uplink card and the interface terminal.

3. The system of claim 1, wherein the digital data bus is a packet data bus.

4. The system of claim 3, wherein packets on the packet data bus are in the Ethernet format.

5. The system of claim 1, wherein the digital data bus uses a multi-point high-level data link control (HDLC) signaling scheme.

6. The system of claim 1, wherein the combination voice/DSL line-card includes voice frequency channel circuitry for processing voice signals and DSL circuitry for processing data signals.

7. The system of claim 6, wherein the voice/DSL line-card further includes a low-pass filter coupled to the voice frequency channel circuitry and a high-pass filter coupled to the DSL circuitry.

8. The system of claim 6, wherein the DSL circuitry modulates the data using QPSK modulation.

9. The system of claim 6, wherein the DSL circuitry modulates the data using DMT modulation.

10. The system of claim 6, wherein the DSL circuitry modulates the data using MVL modulation.

11. The system of claim 1, wherein the customer interface device includes DSL modulation circuitry.

12. The system of claim 11, wherein the DSL modulation circuitry in the customer interface device modulates the data using QPSK modulation.

13. The system of claim 1, wherein the data uplink card comprises:
a data bus interface for interfacing to the digital data bus;
a forwarding engine for managing the transport of data signals between the uplink card and the interface terminal; and
an uplink interface for coupling the data signals to the interface terminal.

14. The system of claim 13, wherein the forwarding engine converts data signals from the digital data bus into a DS-1 signal.

15. The system of claim 13, wherein the forwarding engine converts data signals from the digital data bus into Ethernet packets.

16. The system of claim 13, wherein the forwarding engine is a programmable microcontroller.

17. The system of claim 13, wherein the forwarding engine is a programmable logic device.

18. The system of claim 1, wherein the customer interface device includes a splitter for splitting the voice signals from the data signals.

19. The system of claim 2, wherein the packet switch is coupled to a plurality of data uplink cards and concentrates the signals from the data uplink cards into a concentrated uplink signal that is coupled to the interface terminal.

* * * * *